US011758219B2

(12) United States Patent
Sharma

(10) Patent No.: US 11,758,219 B2
(45) Date of Patent: *Sep. 12, 2023

(54) SYSTEMS AND METHODS FOR FACILITATING SETTING OF TELEVISION PROGRAM SERIES RECORDING PRIORITY RANKING

(71) Applicant: DISH NETWORK TECHNOLOGIES INDIA PRIVATE LIMITED, Bengaluru Karnataka (IN)

(72) Inventor: Deepak Sharma, Bangalore (IN)

(73) Assignee: DISH NETWORK TECHNOLOGIES INDIA PRIVATE LIMITED, Bengaluru Karnataka (IN)

( * ) Notice: Subject to any disclaimer, the term of this patent is extended or adjusted under 35 U.S.C. 154(b) by 2 days.

This patent is subject to a terminal disclaimer.

(21) Appl. No.: 17/463,135

(22) Filed: Aug. 31, 2021

(65) Prior Publication Data

US 2021/0400335 A1 Dec. 23, 2021

Related U.S. Application Data

(63) Continuation of application No. 16/573,829, filed on Sep. 17, 2019, now Pat. No. 11,134,303.

(51) Int. Cl.
*H04N 21/433* (2011.01)
*H04N 21/442* (2011.01)
(Continued)

(52) U.S. Cl.
CPC ....... *H04N 21/4334* (2013.01); *H04N 21/251* (2013.01); *H04N 21/4263* (2013.01); *H04N 21/44204* (2013.01); *H04N 21/47214* (2013.01)

(58) Field of Classification Search
CPC ............ H04N 21/4334; H04N 21/251; H04N 21/4263; H04N 21/44204;
(Continued)

(56) References Cited

U.S. PATENT DOCUMENTS

| 8,798,444 B1* | 8/2014 | Crandall | ............ H04N 21/4622 386/292 |
| 2005/0204388 A1* | 9/2005 | Knudson | .............. H04N 21/482 725/58 |

(Continued)

*Primary Examiner* — Thai Q Tran
*Assistant Examiner* — Stephen R Smith
(74) *Attorney, Agent, or Firm* — VLP Law Group

(57) ABSTRACT

Systems and methods for facilitating setting of television program series recording priority ranking include functionality that monitors television series program viewing habits of a user for a plurality of different television program series. The system then changes television program series recording priority rankings to resolve recording conflicts based on the monitoring of the television series program viewing habits. In some embodiments, the system first sends a notification to the user of an option to upgrade a recording priority ranking. Additionally, the system may record television program episodes whose recordings were skipped due to them having a lower recording priority ranking. The system may record such skipped television program episodes during the next time slot in which a skipped episode is rebroadcast and does not conflict with a higher priority broadcast.

5 Claims, 7 Drawing Sheets

(51) Int. Cl.
*H04N 21/426* (2011.01)
*H04N 21/472* (2011.01)
*H04N 21/25* (2011.01)

(58) Field of Classification Search
CPC ....... H04N 21/47214; H04N 21/44222; H04N 21/4583; H04N 21/4667; H04N 21/4882
USPC ................... 386/213, 230, 291–299; 360/60; 725/139, 142
See application file for complete search history.

(56) References Cited

U.S. PATENT DOCUMENTS

| | | | |
|---|---|---|---|
| 2007/0071399 A1 | 3/2007 | Ellis | |
| 2007/0154163 A1* | 7/2007 | Cordray | H04N 21/4755 386/278 |
| 2008/0101763 A1* | 5/2008 | Bhogal | H04N 21/4312 386/291 |
| 2010/0061708 A1* | 3/2010 | Barton | H04N 21/4826 386/241 |
| 2011/0194840 A1* | 8/2011 | Alexander | H04N 21/4583 386/293 |
| 2012/0224834 A1* | 9/2012 | Chen | H04N 21/4583 386/293 |
| 2012/0301117 A1* | 11/2012 | Alder | H04N 21/4583 386/293 |
| 2013/0055312 A1* | 2/2013 | Cheng | H04N 21/4325 725/49 |
| 2014/0270712 A1* | 9/2014 | Bennett | H04N 21/4532 386/292 |
| 2014/0355963 A1* | 12/2014 | Babu | H04N 21/47214 386/292 |
| 2015/0030310 A1* | 1/2015 | Nesbitt | H04N 21/4627 386/239 |
| 2016/0014461 A1* | 1/2016 | Leech | H04N 21/4312 725/14 |
| 2016/0088358 A1* | 3/2016 | Garcia Navarro | H04N 21/44222 725/46 |
| 2016/0142783 A1* | 5/2016 | Bagga | H04N 21/4821 725/47 |
| 2017/0094355 A1* | 3/2017 | McCarty | H04N 21/44222 |
| 2017/0111694 A1* | 4/2017 | Marsh | H04N 5/781 |
| 2017/0150221 A1 | 5/2017 | Jamil et al. | |
| 2017/0214975 A1* | 7/2017 | Schmidt | H04N 21/482 |
| 2018/0007437 A1* | 1/2018 | Jin | H04N 5/76 |
| 2019/0104337 A1* | 4/2019 | Catalano | H04N 21/4147 |

* cited by examiner

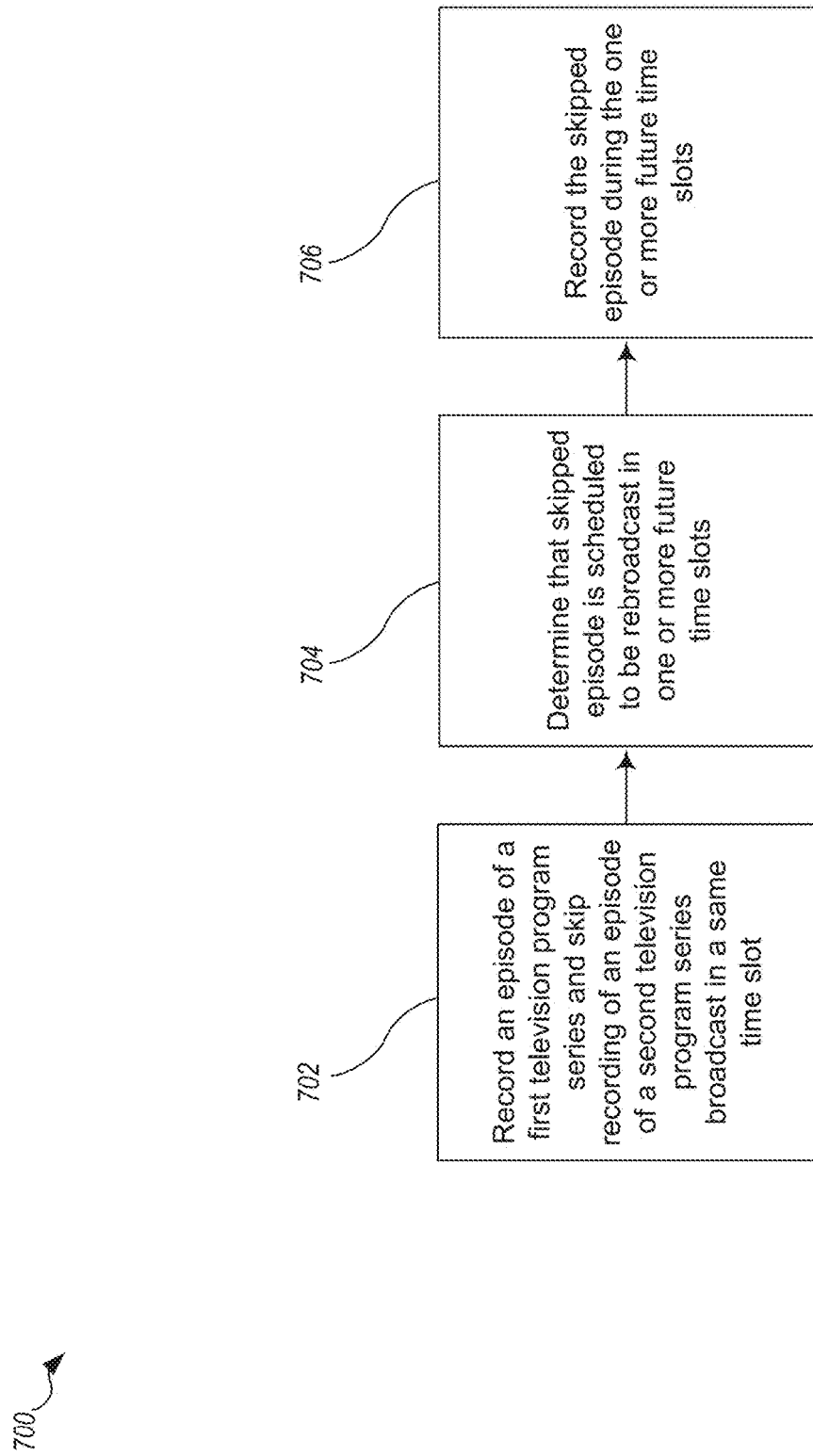

SYSTEMS AND METHODS FOR FACILITATING SETTING OF TELEVISION PROGRAM SERIES RECORDING PRIORITY RANKING

TECHNICAL FIELD

The technical field relates to television program series recording, and particularly to facilitating setting of television program series recording priority ranking.

BRIEF SUMMARY

There exists a technical problem of how to adjust recording priority rankings according to a user's current preferences without the user having to first recognize that their preferences may have changed, then remember that there was a recording set for particular television program series, and finally manually reassign the recording priority rankings accordingly each time the user's preferences may have changed.

The present disclosure provides a technical solution to the technical problem above by, in some embodiments, automatically monitoring television series program viewing habits of a user for a plurality of different television program series and then changing a television program series recording priority ranking of at least two of the plurality of different television program series based on the monitoring of the television series program viewing habits. In some embodiments, the system first sends a notification to the user of an option to upgrade a recording priority ranking of a first television program series to a higher priority ranking than a second television program series based on the monitoring of the television series program viewing habits of the user. Additionally, the system may record television program episodes whose recordings were originally skipped due to them having a lower recording priority ranking. In particular, the system may record such skipped television program episodes during the next time slot in which a skipped episode is rebroadcast and does not conflict with a higher priority broadcast.

[rest of summary to be inserted once claims are finalized]

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 7 is a flow diagram of an example method for recording television program series episodes that were not previously recorded due to recording priority ranking, according to an example embodiment.

DETAILED DESCRIPTION

Figure 1:
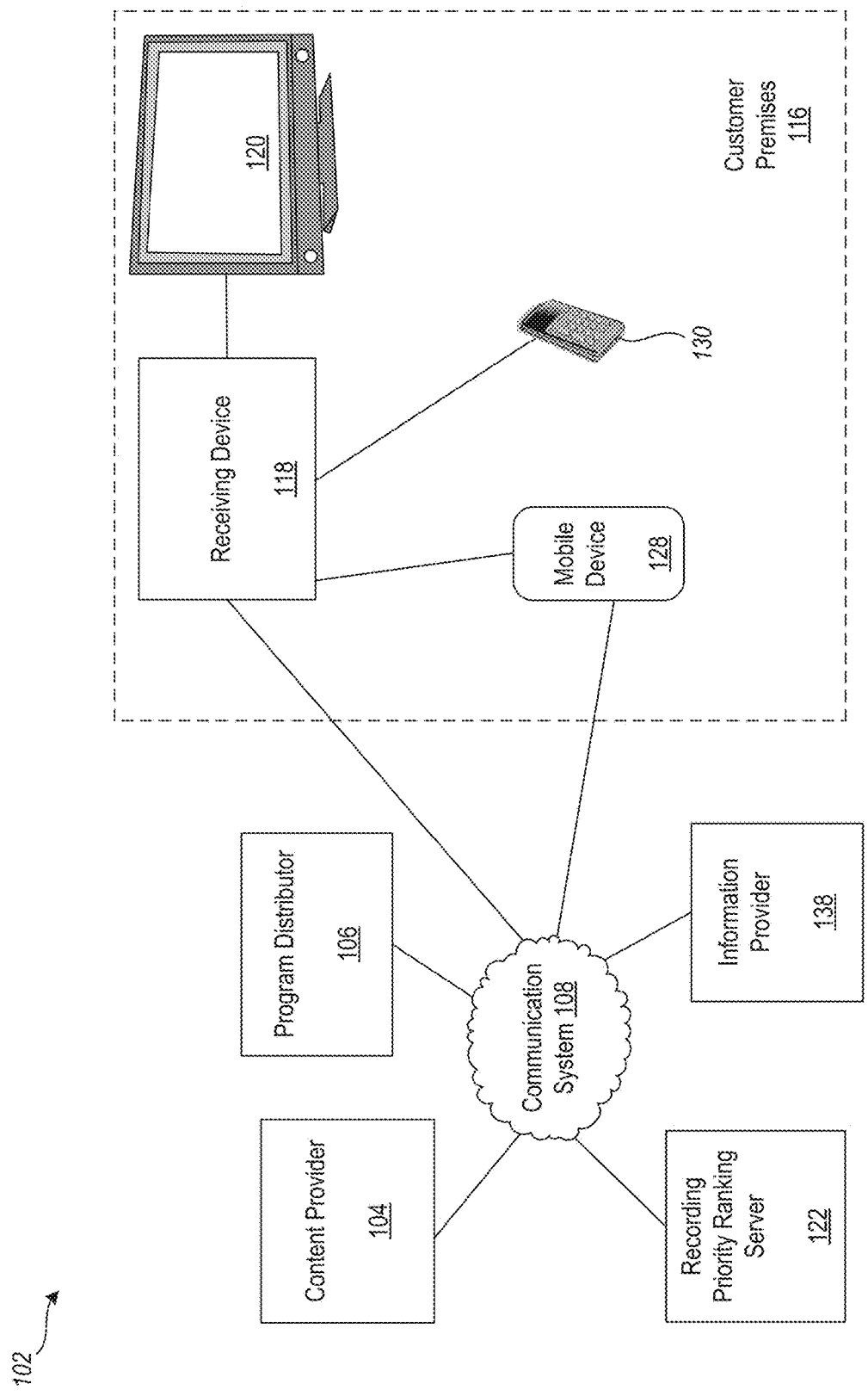
FIG. 1 is an overview block diagram illustrating a technical environment in which embodiments of systems and methods for facilitating setting of television program series recording priority ranking may be implemented, according to an example embodiment.

Receiving devices such as set-top boxes and digital video recorders (DVRs) have a limited number of tuners on which to record different television programs at the same time. Therefore, a user often must prioritize which television program or television program series to record if there is a conflict between two or more television programs being broadcast in a same time slot that the user desires to record. This may be performed by the user assigning a television program series recording priority ranking to each television program series the user would like to record in case there is a future conflict in broadcast time slots between the various television program series the user would like to record. Then, a receiving device or DVR can resolve such a conflict by referring to such a list of television program series recording priority rankings and then recording the television program of the television program series having the highest ranking between the conflicting television program series. If there are multiple television tuners (e.g., n television tuners), the receiving device or DVR can record the n highest ranking television series among the conflicting television program series.

However, after assigning the recording priority ranking to each television program series the user would like to record, it may occur that the user in fact does not prefer the higher ranking television series anymore. For example, the user may in fact no longer watch the currently higher ranked television program series more than one or more of the currently lower ranked television program series, or may have watched many more recent episodes of the lower ranked television program series than recent episodes of the higher ranked television program series. This presents a technical problem of how to adjust the recording priority rankings according to the user's current preferences without the user having to first recognize that their preferences may have changed, then remember that there was a recording set for the particular television program series, and finally manually reassign the recording priority rankings accordingly each time the user's preferences may have changed.

The present disclosure provides a technical solution to the technical problem above by, in some embodiments, automatically monitoring television series program viewing habits of a user for a plurality of different television program series and then changing a television program series recording priority ranking of at least two of the plurality of different television program series based on the monitoring of the television series program viewing habits. In some embodiments, the system first sends a notification to the user of an option to upgrade a recording priority ranking of a first television program series to a higher priority ranking than a second television program series based on the monitoring of the television series program viewing habits of the user. Additionally, the system may record television program episodes whose recordings were originally skipped due to them having a lower recording priority ranking. In particular, the system may record such skipped television program episodes during the next time slot in which a skipped episode is rebroadcast and does not conflict with a higher priority broadcast.

FIG. 1 is an overview block diagram illustrating a technical environment 102 in which embodiments of systems and methods for facilitating setting of television program series recording priority ranking may be implemented, according to an example embodiment.

Before providing additional details regarding the operation and constitution of systems and methods for facilitating setting of television program series recording priority ranking, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided as a program content stream for use by a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider or Internet service provider outside the customer premises 116, and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108. Such television broadcast may include episodes of a television program series, which may include many television program episodes associated with the same title, topic or other common identifier. In some embodiments, the episodes of different television program series may be broadcast on various different channels and in different linear time slots as indicated on a linear electronic program guide (EPG). The EPG may indicate, for example, in a grid pattern, the specific channel and time slot on that channel in which future episodes will be broadcast for various different television program series. Also, the receiving device 118 may be configured to receive, process and display on the presentation device 120 streaming media content received directly from the satellite or cable television service provider and/or other content provider 104.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. In some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider or other source outside the customer premises 116 and prepare or output such programming for presentation. The receiving device 118 may often communicate that programming to another device, such as a presentation device 120. Further, the receiving device 118 may itself include user interface devices, such as buttons or switches. In some example embodiments, the receiving device 118 may be configured to receive and decrypt content and/or software or firmware updates according to various digital rights management (DRM) and other access control technologies and architectures as part of or in addition to the process of facilitating setting of television program series recording priority ranking, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smartphone, mobile device or other computing device or media player, and the like. The presentation device 120 may employ a display, one or more speakers, and/or other output devices to communicate video and/or audio content to a user. In some embodiments, presentation device 120 employs a microphone, keyboard, and/or other input devices to communicate commands or other input to the presentation device 120 and/or receiving device 118. In many implementations, one or more presentation devices 120 reside in or near a customer premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In many embodiments, a remote-control device (remote control) 130 is operable to control the receiving device 118 and/or the presentation device 124. The remote control 130 typically communicates with the receiving device 118 using a suitable wireless medium, such as infrared (IR), radio frequency (RF), or the like. The remote control 130 may include a microphone that may be voice or audio activated in order to receive commands or other voice input. In some embodiments, such voice input may be communicated to and used by the receiving device 118, presentation device 120 and/or mobile device 128 and cause such devices to perform other actions. For example, such voice input may be processed by the receiving device 118, presentation device 120 and/or mobile device 128 as an answer or other response to supplemental content, prompts or notifications presented by such systems. In some embodiments, the remote 130 may be a voice-enabled remote and the same microphone may also be used to receive voice commands from the user and transmit corresponding commands to the receiving device 118 to control the receiving device 118 and/or other peripheral devices.

In the example embodiment shown in FIG. 1, handheld mobile device 128 may be communicatively connected to the television receiving device 118. For example, mobile device 128 may be a handheld mobile device of a user (e.g., a customer of a satellite, cable or streaming media subscription service associated with customer premises 116 or other user) such as a smartphone, tablet device or other computing or communications device. There may be fewer or additional mobile devices in various embodiments. The mobile device 128 may communicate over communication system 108 with the television receiving device 118, program distributor 106, content provider 104, recording priority ranking server 122 and/or information provider 138 using the transmission control protocol/Internet protocol (TCP/IP) suite of networking communication protocols or other communication protocols. The mobile device 128 may also or instead communicate directly with the receiving device 118, remote control 130 and/or presentation device 120 over one or more short range wireless networks or peer-to-peer networks. In the present example, a cable or satellite television service provider may encompass or be in communication with some or all of the content provider 104, program distributor 106, recording priority ranking server 122, and information provider 138.

A content provider 104 provides program content, such as television content, to a distributor, such as the program distributor 106. Example program distributors include, but are not limited to, satellite and cable television service providers. Example content providers include television stations which provide local or national broadcast television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that may be ultimately communicated to the receiving device 118 as a program content stream. Various embodiments of the receiving device 118 may receive programming from program distributors 106 and/or directly from content providers 104 via locally broadcast radio, RF signals, cable, fiber optic, Internet media, or the like via the communication system 108.

In some embodiments, the receiving device 118 may be a set-top box that is typically provided by the cable provider, satellite provider, or other program distributor 106 to which the customer may subscribe to receive such television services and may also receive programming through other channels using a terrestrial, satellite signal, and/or cable television format. The mobile device 128 in communication with the receiving device 118 may be provided by the program distributor, such as a cable provider or satellite provider. However, in some instances, such mobile devices may be devices other than those provided by the program distributor 106. For example, these may include various user devices such as a tablet device, game machine, smartphone, mobile device or other computing device or media player or communications device not provided by or controlled by the cable provider, satellite provider, or other program distributor to which the customer subscribes for the television services.

The recording priority ranking server 122 is operably coupled to the communication system 108 and may be a system of an entity that provides automated recording priority ranking, or suggestions for recording priority ranking, based on viewing habits of a user for a plurality of different television program series. For example, in some embodiments, the recording priority ranking server 122 may receive information representing viewing habits of a user for a plurality of different television program series and then determine recording priority ranking for the plurality of different television program series. This information may then be communicated to the receiving device 118 to perform recordings based on the recording priority ranking for the plurality of different television program series determined by the recording priority ranking server 122. The recording priority ranking server 122 may also or instead send such information to the content provider 104, program distributor 106 and/or information provider 138. In some embodiments, the recording priority ranking server 122 may determine an initial recording priority ranking based on the viewing habits of a plurality of users and different customers of the program distributor 106, other service provider or data aggregator. In some embodiments, the determining of the recording priority ranking, or the suggestions for recording priority ranking, based on viewing habits of a user for a plurality of different television program series may also or instead be performed by the receiving device 118.

The environment 102 may include many systems associated with a television service provider, such as the program distributor 106, that operate in a manner such as the recording priority ranking server 122 described herein. The recording priority ranking server 122 represents one or more of such systems in various embodiments. Such functionality may also or instead be performed by the receiving device 118, mobile device 128 and/or remote control device 130.

In addition, information provider 138 may provide various forms of content and/or services to various devices residing in the customer premises 116. For example, information provider 138 may provide information to the receiving device 118 regarding customer or user accounts associated with the program content stream and/or receiving device 118; corresponding user preferences and settings; EPG information; and/or additional processing of the EPG information to enable the receiving device 118 and/or recording priority ranking server 122 to: access current recording priority rankings; monitor television series program viewing habits; determine there exists a program recording conflict between first television program series and second television program series; determine there is a viewing preference for first television program series over second television program series; and notify the user of an option to upgrade recording priority ranking of first television program series to be higher than second television program series. Such services may include artificial intelligence and machine learning functionality to improve the user preference determination based on a feedback loop including information regarding viewing habits from the receiving device 118, mobile device 128 and/or receiving devices and mobile devices of other users.

The above description of the environment 102, the customer premises 116, and the various devices therein, is intended as a broad, non-limiting overview of an example environment in which various embodiments of facilitating setting of television program series recording priority ranking may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different recording priority ranking servers, content providers, program distributors and information providers that operate in a corresponding manner as the recording priority ranking server 122, the content provider 104, program distributor 106 and information provider 138 as described herein. Each of recording priority ranking server 122, the content provider 104, program distributor 106 and information provider 138 may represent one or more of such systems in various embodiments.

Example embodiments described herein provide applications, tools, data structures and other support to implement facilitating setting of television program series recording priority ranking. Other embodiments of the described techniques may be used for other purposes, including television program recommendations and EPG guide organization and modification. Also, facilitating setting of television program series recording priority ranking may be performed by various other devices, such as audio and DVD players, digital recorders, computers, peripherals, televisions, mobile devices, virtual reality systems, active speakers, headphones, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
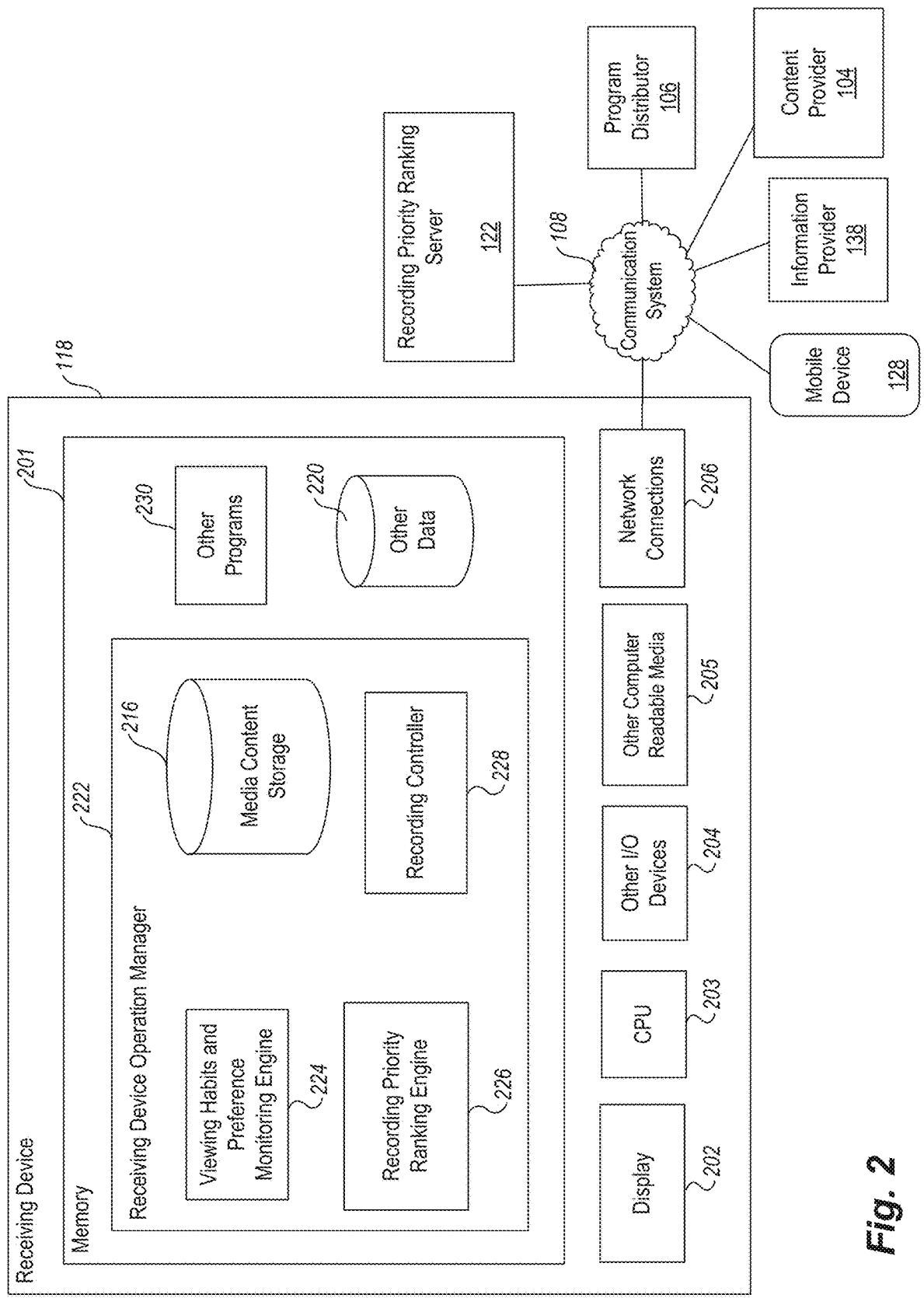
FIG. 2 is a block diagram illustrating elements of an example receiving device used in systems and methods for facilitating setting of television program series recording priority ranking, according to an example embodiment.

FIG. 2 is a block diagram illustrating elements of an example receiving device 118 used in systems and methods for facilitating setting of television program series recording priority ranking, according to an example embodiment.

In one embodiment, the receiving device 118 is a device such as a set-top box, television, DVR, DVD player, PC, tablet device, game machine, smartphone, mobile device or other computing device or media player configured to receive programming via a connection to a satellite or cable television service provider, or other media content provider outside the customer premises, and to display such programming on a presentation device. For example, the receiving device 118 may be configured to receive, process and display on a presentation device, such as presentation device 120 shown in FIG. 1, cable or satellite television broadcasts via various physical and logical channels of communication and/or other programming such as streaming media content.

Note that one or more general purpose or special purpose computing systems/devices may be used to operate the receiving device 118; store information regarding the receiving device 118; store metadata; perform DRM and key management operations; decrypt and encrypt received content; pair with various mobile devices on a home LAN and/or over the Internet; establish a connection between the receiving device 118 and various mobile devices; communicate data, including programming, between the receiving device 118 and various mobile devices (including mobile device 128) via a home LAN and/or Internet; and communicate with the content provider 104, program distributor 106, information provider 138 and/or recording priority ranking server 122. In addition, in some embodiments, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206 (which may include one or more tuners).

The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as well as the establishing of a connection over the home LAN and/or Internet between the receiving device 118 and various mobile devices. The components of the receiving device 118 and operation manager 222 may also execute on one or more CPUs 203 to facilitate communication of other data, including programming, between the receiving device 118 and various mobile devices via the connection over the home LAN and/or Internet, as described herein. The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various broadcast television and on-demand service software applications stored in memory 201 and on various mobile devices. The receiving device operation manager 222 also facilitates communication with peripheral devices such as a remote control, via the I/O devices 204, and with the mobile device 128 and remote systems (e.g., the content provider 104, the recording priority ranking server 122, the program distributor 106, and/or the information provider 138) via the network connections 206.

Recorded or buffered programming of a program content stream received as broadcast television (e.g., via one or more television tuners of network connections 206), streaming media content or other types of programming may reside on the media content storage 216, either in decrypted or encrypted form as applicable for securely storing, processing and displaying of the received media content according to the applicable DRM associated with the particular programming. The media content storage 216 may also store various generated supplemental content, program metadata associated with the recorded or buffered programming and/or supplemental content stored in the media content storage 216, such as that including, but not limited to: television program series recording schedules; television program series recording selections; television program series recording preferences; scheduled recordings for a plurality of different television program series; recording priority rankings of a plurality of different television program series; data representing television series program viewing habits of a user for a plurality of different television program series; data representing program recording conflicts; data representing viewing preferences of one or more users; EPG data; data representing notifications of one or more options to upgrade a recording priority rankings; DRM data; tags; codes, identifiers, format indicators, timestamps, user identifications, authorization codes, digital signatures, etc.

The viewing habits and preference monitoring engine 224 is configured to monitor television series program viewing habits of a user for a plurality of different television program series. For example, the plurality of different television program series may be or include those for which a user has selected to record future episodes on the media content storage 216 or on another device. In some embodiments, the viewing habits and preference monitoring engine 224 accesses on the media content storage or data repository 220 a list of television series that have been selected for future recording and/or a current recording priority ranking of a plurality of different television program series to determine the television series for which to monitor viewing habits. The viewing habits and preference monitoring engine 224 may monitor which channels the receiving device 118 is tuned to, the time of day, day of week, month, and week of year each channel is tuned to and for how long each channel is tuned to individual channels. The viewing habits and preference monitoring engine 224 may monitor which television programs are broadcast on each channel and when, such as by accessing EPG data or other data identifying a current television program currently being broadcast on a particular channel, to determine which television programs a user views, for how long and when. The viewing habits and preference monitoring engine 224 may monitor viewing of recorded programs and unrecorded (e.g., live broadcast) programs as well.

The viewing habits and preference monitoring engine 224 may also monitor viewing habits of multiple different users and identify or associate viewing habits with particular different users. This may be accomplished, for example, by identifying which user is currently viewing the presentation device 120, mobile device 128 and/or operating the receiving device 118 via a user login with one or more user credentials, prompting the user to identify which user is currently viewing the programming and/or biometric identification (e.g., via face recognition, voice recognition, fingerprint recognition, eye recognition or other biometric verification). Such user identification processes may be performed via functionality of the receiving device 118, presentation device 120 and/or mobile device 128 in direct or indirect communication with the receiving device 118, such as via the program distributor 106, content provider 104, recording priority ranking server 122 and/or information provider 138 over communication system 108.

In some embodiments, the viewing habits and preference monitoring engine 224 may determine that the user has a viewing preference for a first television program series over a second television program series. For example, this may be performed by determining a viewing time of the first television program series; determining a viewing time of the second television program series; comparing the viewing time of the first television program series to the viewing time of the second television program series; and determining that the user has a viewing preference for the first television program series over the second television program series based on the comparison of the viewing time of the first television program series to the viewing time of the second television program series. For example, if the user's viewing time of the first television program series is greater than the user's viewing time of the second television program series, the viewing habits and preference monitoring engine 224 may determine that the user has a viewing preference for the first television program series over the second television program series.

The viewing habits and preference monitoring engine 224 may consider viewing time over various different time periods. For example, when comparing viewing habits of two television program series, the viewing time of the first television program series may be a total current viewing time of the first television program series and the viewing time of the second television program series may be a total current viewing time of the second television program series. As another example, the viewing time of the first television program series may be a total viewing time of the first television program series over a most recent predetermined time period and the viewing time of the second television program series may be a total viewing time of the second television program series over the most recent predetermined time period. For example, the time period considered may be viewing time over the most recent week, quarter, month or year.

In some embodiments, the viewing time considered may be a time period measured back from the date of the most recent episode broadcast for each television program series being compared. For example, if the user has more viewing time of the first television program series in the three months prior to the broadcast of the newest episode of the first television program series than viewing time of the second television program series in the three months prior to the broadcast of the newest episode of the second television program series, then the viewing habits and preference monitoring engine 224 may determine that the user has a viewing preference for the first television program series over the second television program series. In other embodiments, the number of different episodes viewed of a particular television program series (either total episodes viewed or episodes viewed within a particular time period) will be considered in determining viewing preference. For example, if the user has viewed more different episodes of the first television program series in the past six months than the second television program series in the same time period, then the viewing habits and preference monitoring engine 224 may determine that the user has a viewing preference for the first television program series over the second television program series.

In some embodiments, the viewing habits and preference monitoring engine 224 may determine that a user has a viewing preference for a first television program series over a second television program series by determining a percentage of a predetermined number of different latest episodes of the of the first television program series that have been viewed by the user. The viewing habits and preference monitoring engine 224 then determines a percentage of a same predetermined number of different latest episodes of the of the second television program series that have been viewed by the user. The viewing habits and preference monitoring engine 224 may then compare the percentage of the predetermined number of different latest episodes of the of the first television program series that have been viewed by the user to the percentage of the same predetermined number of different latest episodes of the of the second television program series that have been viewed by the user. The viewing habits and preference monitoring engine 224 may determine that the user has a viewing preference for the first television program series over the second television program series based on this comparison of the percentage of the predetermined number of different latest episodes of the of the first television program series that have been viewed by the user to the percentage of the same predetermined number of different latest episodes of the of the second television program series that have been viewed by the user. For example, if the user has viewed 80% of the 10 different latest episodes of the of the first television program series and only 30% of the 10 different latest episodes of the of the second television program series, then the viewing habits and preference monitoring engine 224 may determine that the user has a viewing preference for the first television program series over the second television program series.

Such viewing time periods, percentages, thresholds and other viewing habit monitoring options for purposes of determining user preference of one television program series over another may be selectable and configured by the user and/or the program distributor 106, content provider 104, recording priority ranking server 122 and/or information provider 138. Also, such comparisons of viewing habits and/or determinations of user preference of one television program series over another may optionally be performed periodically (e.g., daily, weekly monthly, after each new episode or series is released, and/or after each new episode or series is finished being viewed), on-demand and/or on a customized schedule. These options may also be selectable and configured by the user and/or the program distributor 106, content provider 104, recording priority ranking server 122 and/or information provider 138.

The recording priority ranking engine 226 maintains and updates the recording television program series recording priority rankings for a plurality of television program series for one or more users. Such rankings indicate which television program series episode will be recorded in case there is a conflict between two or more television program series that are scheduled to be recorded by the receiving device 118 (or DVR in communication with the receiving device 118) but have episodes being broadcast in the same time slot or otherwise overlapping in their broadcast time. Such a situation may arise when there are not enough tuners of the receiving device 118 to tune to all the channels carrying different television program series that are scheduled for recording at the same time or overlapping times.

For example, each television program series scheduled for recording may be assigned a rank (e.g., by the receiving device 118 or by the user). In case there is a recording conflict between two or more of the television program series, the television program series with the higher rank will be recorded. For example, if the receiving device 118 has two tuners, but three television program series are scheduled to be recorded at the same time slot, then only the two highest ranking television program series, according to the recording television program series recording priority rankings, will be tuned to and recorded at that time slot. The scheduled recording of the other lower ranking television program series episode will thus be skipped.

Such rankings, or similar rankings, may also or instead be used for storage space priority. In particular, storage space for television program recordings may be provided, possibly among other priorities, according to the television program series recording priority rankings. For example, if there is storage space left for only one more episode of a television program, only the television program series that has an upcoming episode recording scheduled with the highest ranking will be recorded and stored.

The recording priority ranking engine 226 may receive information from the viewing habits and preference monitoring engine 224 regarding current user preferences regarding particular television program series and adjust (or send notifications with suggestions to the user to adjust) the current recording priority rankings accordingly. In some embodiments, the viewing habits and preference monitoring engine 224 may determine, based on the monitored viewing habits of the user, that the user has a viewing preference for a first television program series over a second television program series. The recording priority ranking engine 226, in response to receiving this information regarding user preference, may send a notification to appear on the presentation device 120 (or to appear on a device accessible by the user, such as the mobile device 128) of an option to upgrade a recording priority ranking of the first television program series to a higher priority ranking than the second television program series. This may be based on the determination that the user has a viewing preference for the first television program series over the second television program series. The recording priority ranking engine 226 may do this for some or all of a plurality of television program series at once. For example, the recording priority ranking engine 226 may send a single notification to the user suggesting an adjustment of ranking for some or all of the television program series on the recording priority ranking list.

In some embodiments, the recording priority ranking engine 226 first determines that there exists a recording conflict between two television program series and then, in response to this determination, determines what the current user preference is between the two television program series for which there exists a recording conflict. If the current user preference is contrary to the current priority ranking between the two television program series for which there exists a recording conflict, then the recording priority ranking engine 226 may send a notification of an option to upgrade the recording priority ranking of the lower ranked television program series of the two conflicting television program series to a higher priority ranking than the currently higher ranked television program series. In some embodiments, the recording priority ranking engine 226 may automatically make the upgrade in ranking. For example, the recording priority ranking engine 226 may determine there exists a program recording conflict between at least two television program series of the plurality of television program series based on at least one episode of a first television program series of the at least two television program series being scheduled to be broadcast in a same time slot as at least one episode of a second television program series of the at least two television program series. The recording priority ranking engine 226 may then determine, based on the monitored viewing habits of the user, that the user has a viewing preference for the first television program series over the second television program series. The recording priority ranking engine 226 may then send a notification to a device accessible by the user, of an option to upgrade a recording priority ranking of the first television program series to a higher priority ranking than the second television program series based on the determination that the user has a viewing preference for the first television program series over the second television program series.

The user may then respond (e.g., via the remote control 130 and/or the mobile device 128) indicating whether the user accepts the suggested adjustment or change in priority rankings included in the notification. If the user does accept such suggested modifications, then the recording priority ranking engine 226 may edit the recording priority ranking list accordingly. The recording priority ranking engine 226 may keep prior versions of the recording priority ranking list in case the user decides to revert back to a previous version. In some embodiments, the recording priority ranking engine 226 may automatically make changes to the recording priority rankings without sending a notification. The receiving device 118 may be configured to make such automatic changes based on a selectable option to enable such automatic changes to the recording priority rankings provided to the user. Such an option may also be selected by the user via the remote control 130 and/or the mobile device 128. In some embodiments, the recording priority ranking engine makes an initial list of television program series recording priority rankings and/or may makes a suggested list periodically or at the command of the user. This initial or suggested list of television program series recording priority rankings may also be based on the viewing preferences of the user determined by the viewing habits and preference monitoring engine 224.

The recording controller 228 initiates, pauses and/or stops recording of television channels and television program series episodes at particular times according to the scheduled future recordings of television program series selected by the user and the television program series recording priority rankings, which may be selected by the user and managed by the recording priority ranking engine 226. The recording controller 228 may control a recording device of the recording controller 228 and/or a DVR in communication with the receiving device 118, such as via the network connections 206 and/or the other I/O devices 204. The recorded television program content may be stored by the recording controller 228 on the media storage 216, data repository 220 and/or remote storage device, such as via communication system 108. In some embodiments, the remote storage device is a device of, or controlled by, the program distributor 106, content provider 104, recording priority ranking server 122 and/or information provider 138.

Other code or programs 230 (e.g., further audio/video processing modules, a program guide manager module, a Web server, and the like), and potentially other data repositories, such as data repository 220 for storing other data (user profiles, preferences and configuration data, etc.), may also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 include an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, a remote control 130, the mobile device 128, program distributor 106, content provider 104, information provider 138, recording priority ranking server 122 or some other module. In this manner, the API may facilitate the development of third-party software, such as various different on-demand service applications, user interfaces, plug-ins, adapters (e.g., for integrating functions of the receiving device operation manager 222 and information provider 138 into mobile device and/or desktop applications), and the like to facilitate setting of television program series recording priority ranking using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to perform: accessing a current recording priority ranking of a plurality of different television program series; monitoring television series program viewing habits of a user for the plurality of different television program series; determining there exists a program recording conflict between at least two television program series of the plurality of television program series based on at least one episode of a first television program series of the at least two television program series being scheduled to be broadcast in a same time slot as at least one episode of a second television program series of the at least two television program series; determining, based on the monitored viewing habits of the user, that the user has a viewing preference for the first television program series over the second television program series; and sending a notification to a device accessible by the user (e.g., the mobile device 128 and/or presentation device 120), of an option to upgrade a recording priority ranking of the first television program series to a higher priority ranking than the second television program series based on the determination that the user has a viewing preference for the first television program series over the second television program series.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The media content storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
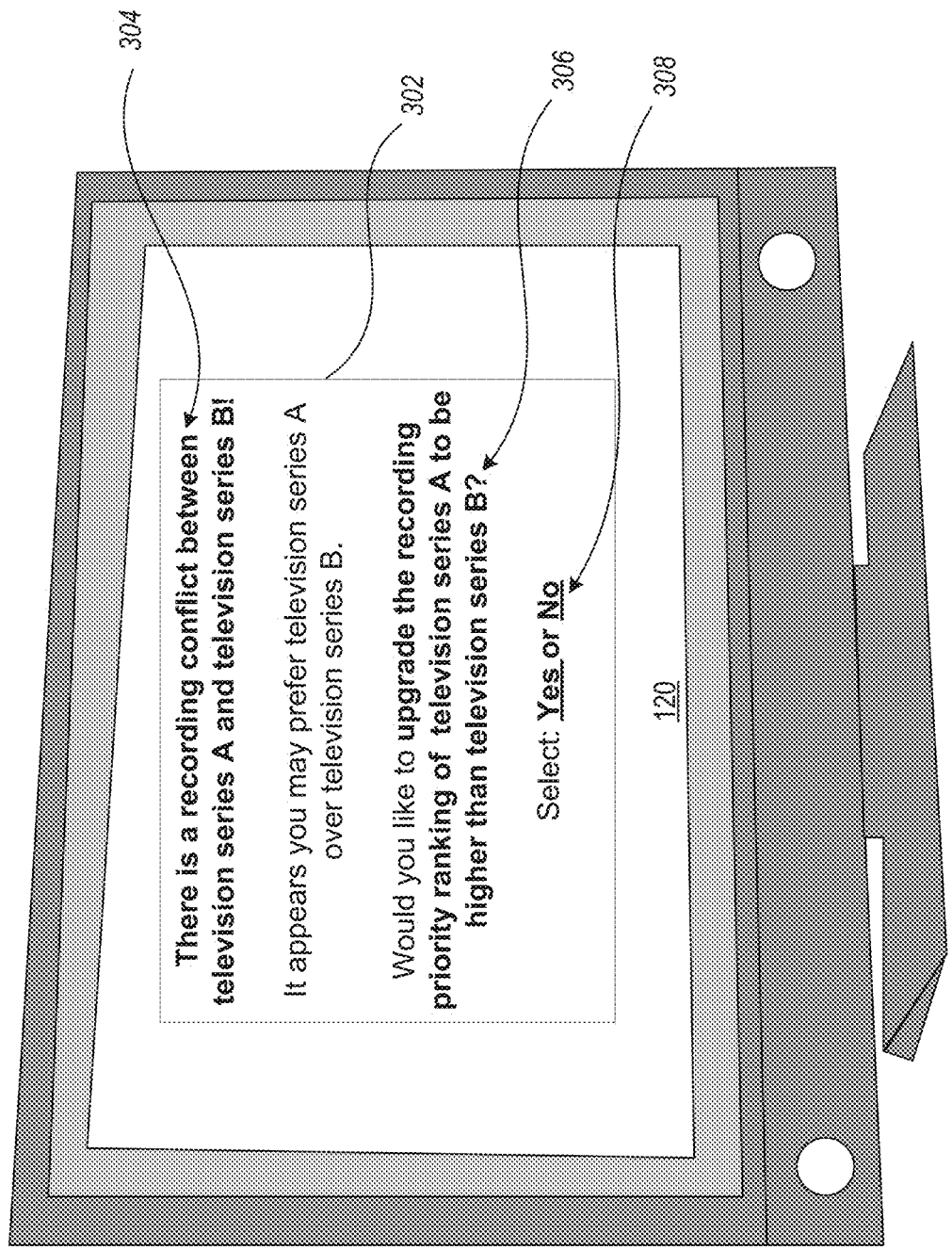
FIG. 3 is a diagram of an example presentation device having an example user interface screen including a notification regarding an option to upgrade a recording priority ranking, according to an example embodiment.

FIG. 3 is a diagram of an example presentation device 120 having an example user interface screen 302 including a notification 306 regarding an option to upgrade a recording priority ranking, according to an example embodiment.

In the example shown in FIG. 3, there has been a recording conflict detected between television series A and television series B and, according to the current recording priority rankings, television series B will be recorded instead of television series A due to this conflict. However, the system has determined (e.g., based on user viewing habits) that the user actually prefers television series A over television series B. Thus, the system has presented on the user interface screen 302 an alert 304 informing the user of the recording conflict between television program series A and television program series B along with a notification 306 including an option to upgrade the recording priority ranking of television program series A to a higher priority ranking than television program series B. In some embodiments, other options will be made available via the notification 306 to change the priority ranking of television program series A with respect to other television program series as well. For example, an interactive suggested recording priority ranking list of all television program series scheduled to be recorded may be provided, in which the user may shift up or down television program series titles displayed in the list (e.g., using the remote control 130 or mobile device 128) to modify the rankings as desired.

Also shown is an interactive user interface element 308 which the user may select (e.g., via remote control 130 or mobile device 128) to provide input indicative of a selection or rejection of the option included in notification 308 to upgrade the recording priority ranking of the television program series A to a higher priority ranking than second television program series B. For example, the user may select "Yes" with the remote control 130 on the option included in the notification 308 to confirm the user would like to upgrade the recording priority ranking of the television program series A to a higher priority ranking than second television program series B. The user may select "No" with the remote control 130 on the option included in the notification 308 to indicate the user would not like to upgrade the recording priority ranking of the television program series A to a higher priority ranking than second television program series B. Additional, different or fewer elements may comprise the user interface screen 302 in various embodiments.

Figure 4:
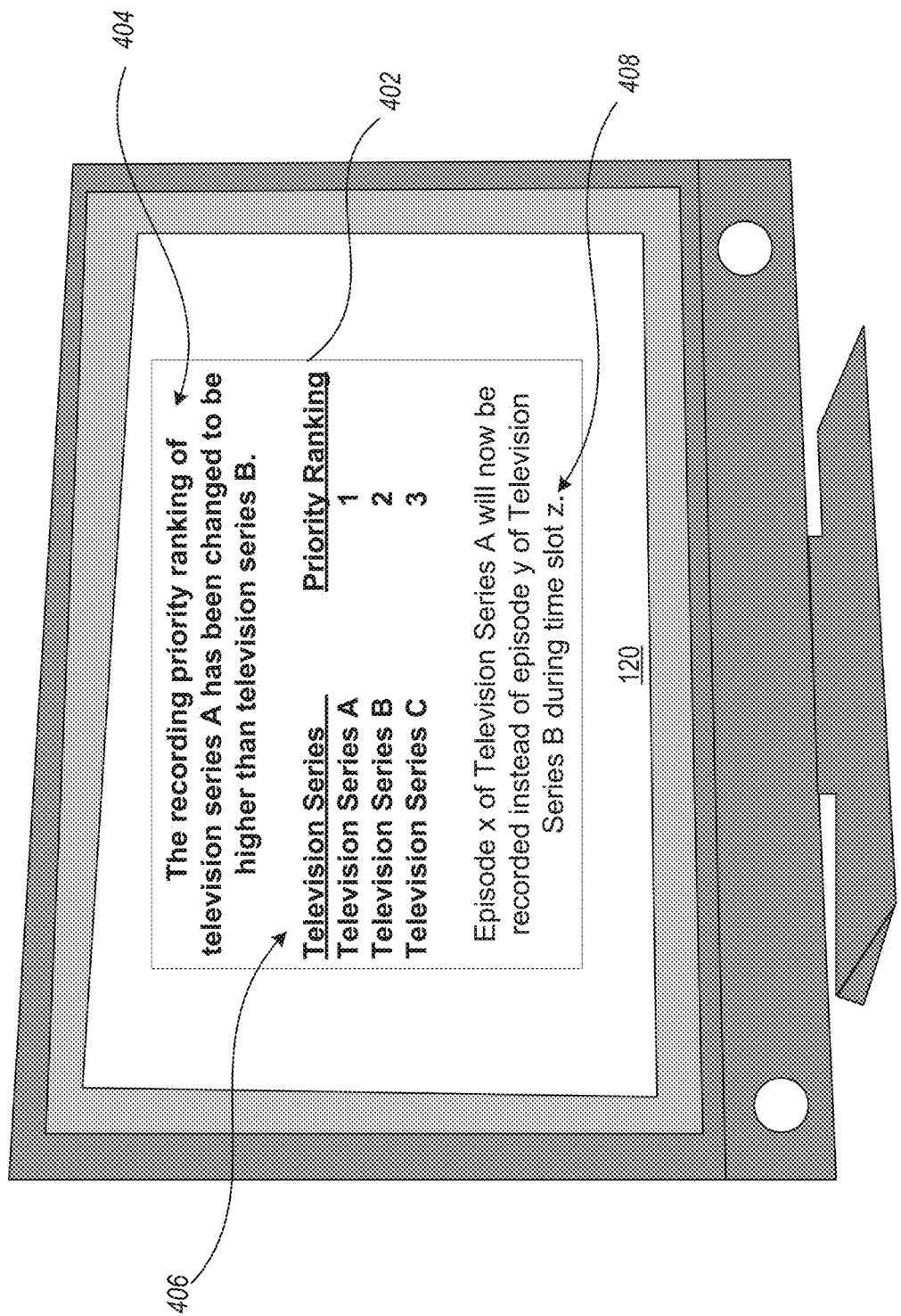
FIG. 4 is a diagram of an example presentation device having an example user interface screen including a confirmation regarding an upgrade of a recording priority ranking, according to an example embodiment.

FIG. 4 is a diagram of an example presentation device 120 having an example user interface screen 402 including a confirmation 404 regarding an upgrade of a recording priority ranking, according to an example embodiment.

In the example shown in FIG. 4, the user has selected "Yes" on the option included in the notification 308 shown in FIG. 3 to confirm the user would like to upgrade the recording priority ranking of the television program series A to a higher priority ranking than second television program series B. In response to this selection, the corresponding change to the recording priority rankings is made and a confirmation 404 is displayed confirming that the recording priority ranking of television series A has been changed to be higher than television series B. Also shown is the current recording priority ranking list 406 of all television program series scheduled to be recorded. Reflected in the current recording priority ranking list 406 is the most recent change in recording priority ranking confirmed by the confirmation 404. Additionally, shown is an indication 408 of what will happen next as a result of the most recent change in recording priority ranking confirmed by the confirmation 404. In particular, the indication 408 states "Episode x of Television Series A will now be recorded instead of episode y of Television Series B during time slot z". Additional, different or fewer elements may comprise the user interface screen 402 in various embodiments.

Figure 5:
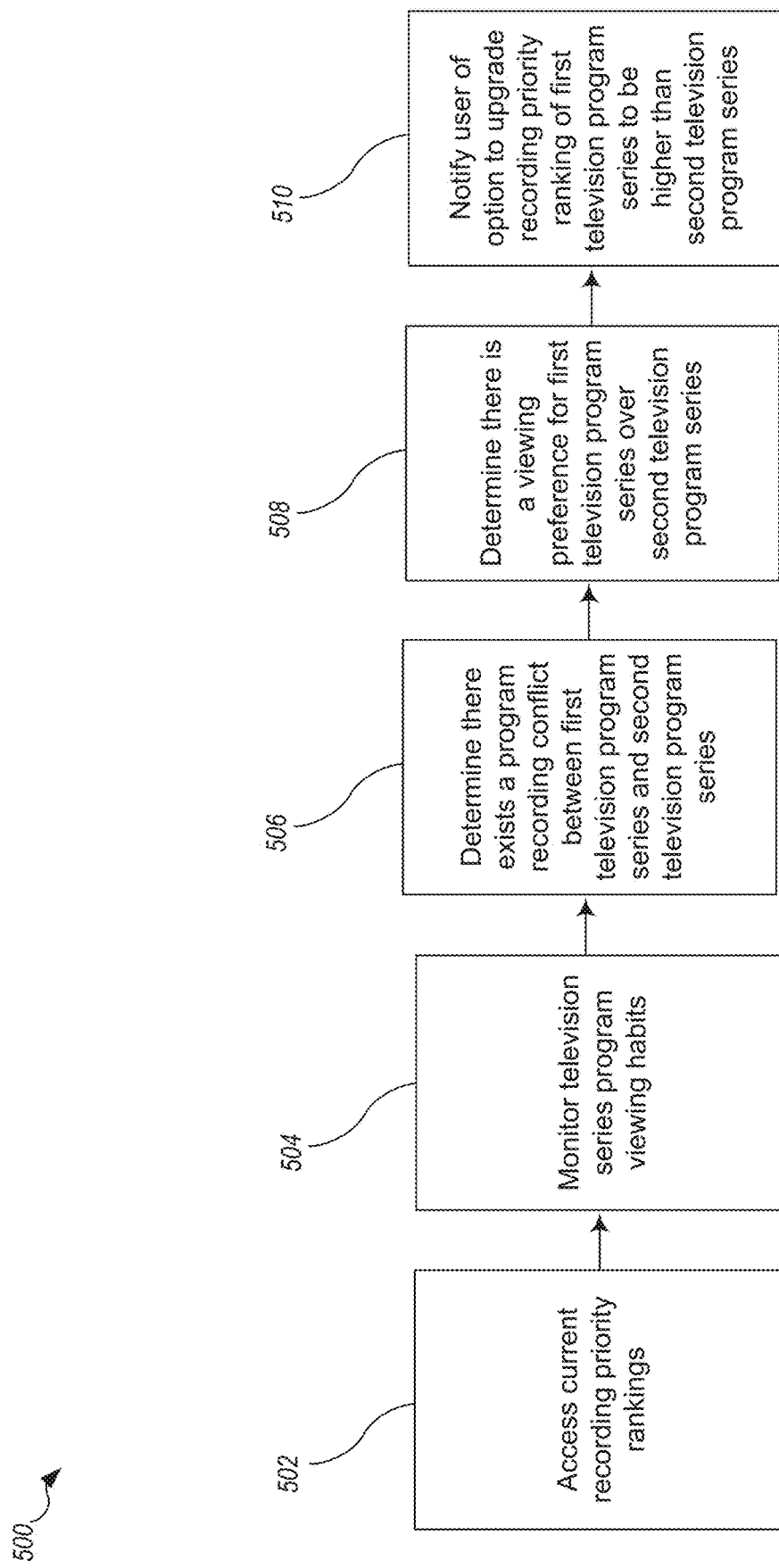
FIG. 5 is a flow diagram of an example method for facilitating setting of television program series recording priority ranking, according to an example embodiment.

FIG. 5 is a flow diagram of an example method 500 for facilitating setting of television program series recording priority ranking, according to an example embodiment.

At 502, a computerized system for facilitating setting of television program series recording priority ranking accesses a current recording priority ranking of a plurality of different television program series.

At 504, the system monitors television series program viewing habits of a user for the plurality of different television program series.

At 506, the system determines there exists a program recording conflict between at least two television program series of the plurality of television program series based on at least one episode of a first television program series of the at least two television program series being scheduled to be broadcast in a same time slot as at least one episode of a second television program series of the at least two television program series.

At 508, the system determines, based on the monitored viewing habits of the user, that the user has a viewing preference for the first television program series over the second television program series.

At 510, the system sends a notification of an option to upgrade a recording priority ranking of the first television program series to a higher priority ranking than the second television program series based on the determination that the user has a viewing preference for the first television program series over the second television program series.

Figure 6:
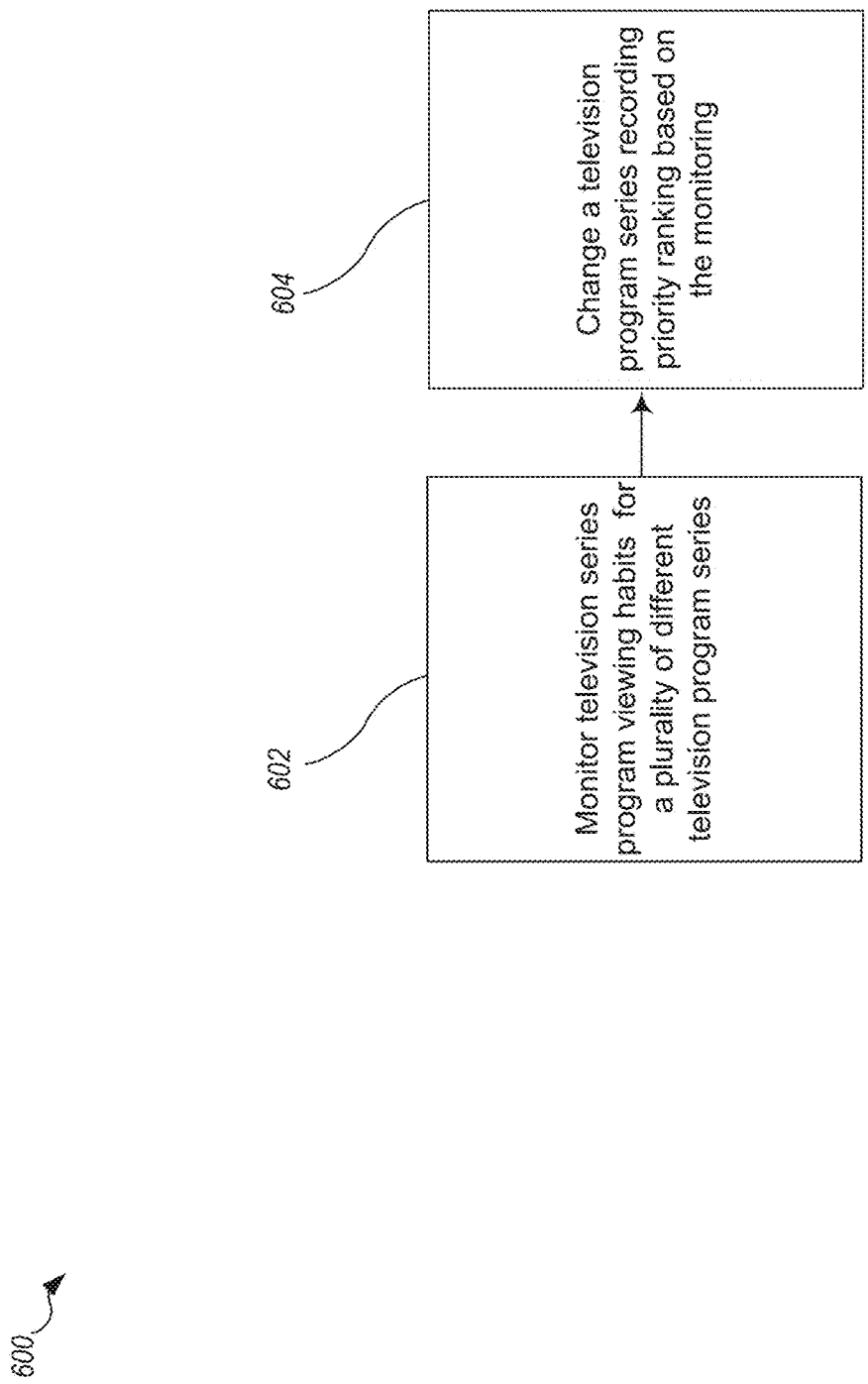
FIG. 6 is a flow diagram of an example method for changing a television program series recording priority ranking, according to an example embodiment.

FIG. 6 is a flow diagram of an example method 600 for changing a television program series recording priority ranking, according to an example embodiment.

At 602, a computerized system for facilitating setting of television program series recording priority ranking monitors television series program viewing habits of a user for a plurality of different television program series.

At 604, the system changes a television program series recording priority ranking of at least two of the plurality of different television program series based on the monitoring of the television series program viewing habits of the user for the plurality of different television program series.

FIG. 7 is a flow diagram of an example method 700 for recording television program series episodes that were not previously recorded due to recording priority ranking, according to an example embodiment.

At 702, a computerized system for facilitating setting of television program series recording priority ranking records an episode of a first television program series and skips recording of an episode of a second television program series broadcast in a same time slot as the episode of the first television program series. This is due to a recording priority ranking of the first television program series being higher than a recording priority ranking of the second television program series.

At 704, the system determines that an episode of the second television program series, whose recording was skipped due to the higher recording priority ranking of the first television program series than the recording priority ranking of the second television program series, is scheduled to be rebroadcast in one or more future time slots.

At 706, the system, in response to the determination that the episode of the second television program series is scheduled to be rebroadcast in one or more future time slots, records, during the one or more future time slots, the episode of the second television program series whose recording was skipped. The recording was previously skipped due to the higher recording priority ranking of the first television program series being higher than the recording priority ranking of the second television program series.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for facilitating setting of television program series recording priority ranking, comprising:
   at least one computer processor; and
   at least one memory coupled to the at least one computer processor, the at least one memory having computer-executable instructions stored thereon that, when executed by the at least one computer processor, cause the at least one computer processor to:
   monitor television series program viewing habits of a user for a plurality of different television program series;
   determine that the user has a viewing preference for the first television program series over the second television program series based on the comparison of the percentage of the predetermined number of different latest episodes of the of the first television program series that have been viewed by the user to the percentage of the same predetermined number of different latest episodes of the of the second television program series that have been viewed by the user; and
   change a television program series recording priority ranking of at least two of the plurality of different television program series based on the monitoring of the television series program viewing habits of the user for the plurality of different television program series.

2. The system of claim 1, further comprising:
   at least two tuners coupled to the at least one computer processor, each of the at least two tuners configured to tune to different television channels on which the plurality of different television program series is broadcast.

3. The system of claim 1 wherein the changing a television program series recording priority ranking of at least two of the plurality of different television program series includes:
   sending a notification to a device accessible by the user, of an option to upgrade a recording priority ranking of a first television program series of the at least two of the plurality of different television program series to a higher priority ranking than a second television program series of the at least two of the plurality of different television program series;

in response to the notification, receiving input indicative of an instruction to upgrade the recording priority ranking of the first television program series of the at least two of the plurality of different television program series to a higher priority ranking than the second television program series of the at least two of the plurality of different television program series; and in response to the input, upgrading the recording priority ranking of the first television program series of the at least two of the plurality of different television program series to a higher priority ranking than the second television program series of the at least two of the plurality of different television program series.

4. The system of claim 3 wherein the device accessible by the user to which the notification is sent is one or more of: a receiving device, a computer, a mobile device, a television and a presentation device.

5. The system of claim 1 wherein the changing a television program series recording priority ranking of at least two of the plurality of different television program series includes:

determining, based on the monitoring of the television series program viewing habits of the user for the plurality of different television program series, that the user has a viewing preference for a first television program series of the at least two of the plurality of different television program series over a second television program series of the at least two of the plurality of different television program series; and in response to the determination that the user has a viewing preference for the first television program series of the at least two of the plurality of different television program series over the second television program series of the at least two of the plurality of different television program series, upgrading the recording priority ranking of the first television program series to a higher priority ranking than the second television program series.

\* \* \* \* \*